US012812694B2

(12) United States Patent
Guo

(10) Patent No.: US 12,812,694 B2
(45) Date of Patent: Nov. 24, 2026

(54) METHODS AND APPARATUS OF TRANSMITTING PHYSICAL RANDOM ACCESS CHANNEL (PRACH) FOR NON-SERVING CELLS

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 300 days.

(21) Appl. No.: 18/748,872

(22) Filed: Jun. 20, 2024

(65) Prior Publication Data

US 2024/0340971 A1 Oct. 10, 2024

Related U.S. Application Data

(63) Continuation of application No. PCT/IB2023/050065, filed on Jan. 4, 2023.

(60) Provisional application No. 63/296,344, filed on Jan. 4, 2022.

(51) Int. Cl.
*H04W 74/0833* (2024.01)

(52) U.S. Cl.
CPC ............................... *H04W 74/0833* (2013.01)

(58) Field of Classification Search
CPC ......... H04W 74/0833; H04W 56/0015; H04W 36/0055; H04W 36/0077; H04W 56/0045; H04W 74/006
See application file for complete search history.

(56) References Cited

U.S. PATENT DOCUMENTS

2008/0273610 A1* 11/2008 Malladi ................. H04L 1/0029 375/260
2019/0159261 A1 5/2019 Jung et al.
2020/0296635 A1* 9/2020 Rastegardoost ...... H04L 5/0048
2021/0368538 A1* 11/2021 Yerramalli ............ G01S 5/0045
2022/0210825 A1* 6/2022 Zhu ................... H04W 56/0045

FOREIGN PATENT DOCUMENTS

WO 2020108384 6/2020
WO 2021141831 7/2021

OTHER PUBLICATIONS

Intel Corporation, "PRACH Preamble and Resource Allocation," 3GPP TSG RAN WG1 Meeting NR Ad-hoc, R1-1700332, Jan. 2017.
WIPO, International Search Report and Written Opinion for International Application No. PCT/IB2023/050065, Sep. 15, 2023.

* cited by examiner

*Primary Examiner* — Shawn D Miller
(74) *Attorney, Agent, or Firm* — Hodgson Russ LLP

(57) ABSTRACT

A method includes (1) receiving, by a terminal device, configuration information of PRACH of one or more non-serving cells; (2) receiving, by the terminal device, a control signaling; (3) determining, by the terminal device, a PRACH preamble and a PRACH occasion according to the configuration information; and (4) transmitting, by the terminal device the PRACH preamble in the PRACH occasion. The control signaling indicates the terminal device to transmit PRACH information to a first non-serving cell of the one or more non-serving cells.

19 Claims, 5 Drawing Sheets

METHODS AND APPARATUS OF TRANSMITTING PHYSICAL RANDOM ACCESS CHANNEL (PRACH) FOR NON-SERVING CELLS

CROSS-REFERENCE TO RELATED APPLICATION(S)

This application is a continuation of International Application No. PCT/IB2023/050065, filed Jan. 4, 2023, which claims priority to U.S. Provisional Patent Application No. 63/296,344, filed Jan. 4, 2022, the entire disclosures which are incorporated herein by reference.

TECHNICAL FIELD

The present disclosure relates to transmission of a physical random access channel (PRACH). More specifically, systems and methods for enabling a terminal device to perform a PRACH transmission for non-serving cells are provided.

BACKGROUND

New Radio (NR) and fifth generation (5G) communication systems support physical downlink control channel (PDCCH) order PRACH transmission. The "PDCCH order PRACH transmission" is a mechanism by which a base station can order a terminal device to initiate a PRACH transmission. One example for this mechanism is when the base station finds that the timing between the base station and the terminal device UE needs an improvement, the base station can order the terminal device to transmit a PRACH and then the base station can measure an uplink timing.

In NR/5G system, the base station uses "DCI format 0_1" to trigger the PDCCH order PRACH transmission. A traditional procedure is illustrated by a method 100 shown in FIG. 1. At block 101, a base station provides a configuration of PRACH to a terminal device. At block 103, the base station sends "DCI format 1_0" to trigger a PRACH transmission. At block 105, the terminal device then decodes the "DCI format 1_0" and sends a PRACH preamble according to indication information indicated in the "DCI format 1_0." The base station, at block 107, then detects the PRACH preamble. At block 109, the base station then sends a PRACH response to the terminal device.

The foregoing traditional approach cannot trigger a terminal device to transmit a PRACH preamble to a non-serving cell. Therefore, when the terminal device is connected with a serving cell, the terminal device cannot send any PRACH information to a non-serving cell. The above deficiency results in that the terminal devices needs to perform a random access procedure for non-serving cells when the terminal device is indicated to switch to that cell. The cell switching enlarges the latency of the whole system and thus inefficient and undesirable. Thus, improved systems and methods that can address the foregoing issues are desirable and beneficial.

SUMMARY

The present disclosure is related to systems and methods for enabling a terminal device to perform a PRACH transmission for non-serving cells. In some embodiments, a terminal device (or user equipment, UE) can be provided with a configuration of the PRACH for one or more non-serving cells. A base station (or a "gNB") can then send a downlink control information (DCI) format to trigger a PRACH transmission towards the non-serving cell. The DCI format is particularly designed for triggering the PRACH transmission for non-serving cells. The base station can then indicate a timing advance value (e.g., a timing advance command in a Media Access Control (MAC) Control Element (CE) message) for a non-serving cell to the terminal device. The terminal device can then perform a PRACH transmission for non-serving cells based on the timing advance value.

Advantages of the present technology include, for example, that it can significantly reduce a latency of inter-cell mobility (or a cell switch). For example, before switching to a target cell (which is a non-serving cell), a serving cell (e.g., a base station) can trigger the terminal device to transmit its PRACH information to the target cell. By this arrangement, an uplink timing to the non-serving cell can be obtained by the terminal device even before the terminal device switches to the target cell. Accordingly, the latency of inter-cell mobility or cell switch can be reduced and an overall system efficiency is increased.

In some embodiments, the present method can be implemented by a tangible, non-transitory, computer-readable medium having processor instructions stored thereon that, when executed by one or more processors, cause the one or more processors to perform one or more aspects/features of the method described herein. In other embodiments, the present method can be implemented by a system comprising a computer processor and a non-transitory computer-readable storage medium storing instructions that when executed by the computer processor cause the computer processor to perform one or more actions of the method described herein.

BRIEF DESCRIPTION OF THE DRAWINGS

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

DETAILED DESCRIPTION

To describe the technical solutions in the implementations of the present disclosure more clearly, the following briefly describes the accompanying drawings. The accompanying drawings show merely some aspects or implementations of the present disclosure, and a person of ordinary skill in the art may still derive other drawings from these accompanying drawings without creative efforts.

Figure 1:
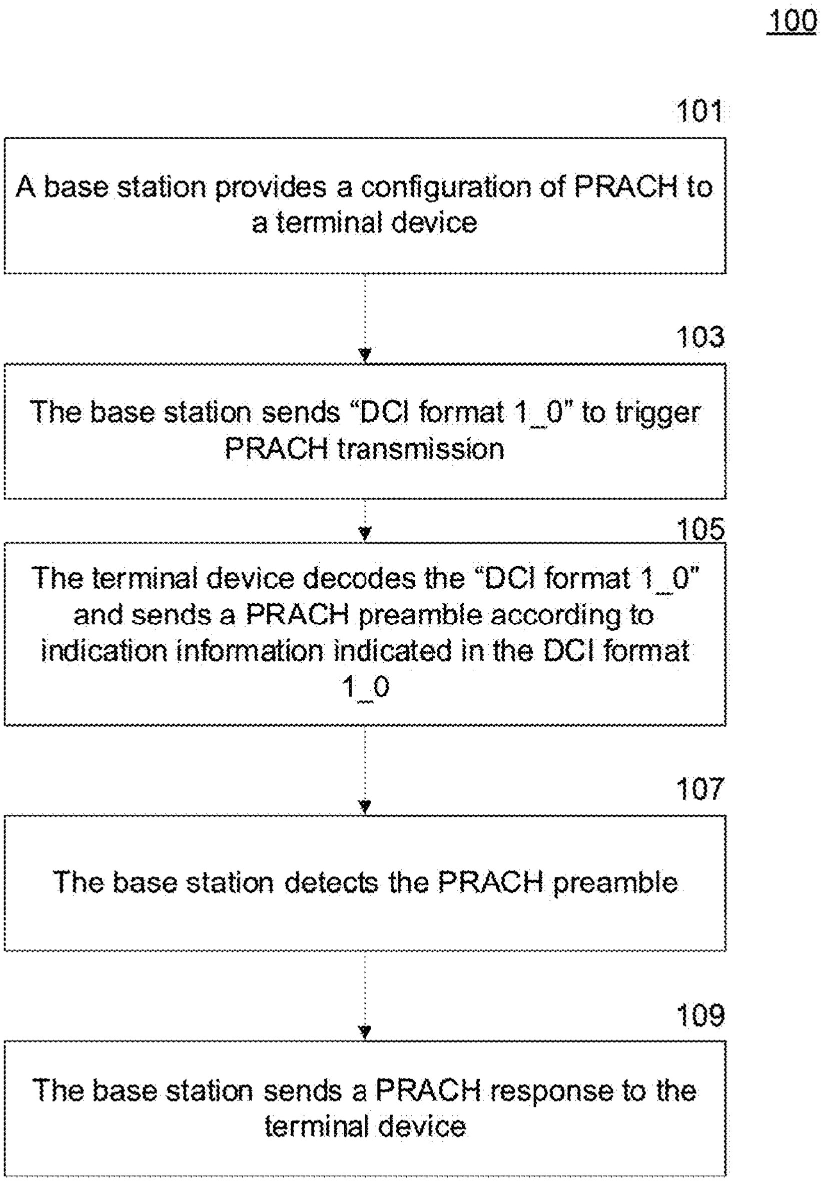
FIG. 1 (PRIOR ART)
FIG. 1 is a flowchart illustrating a traditional method used by prior art.
Figure 2:
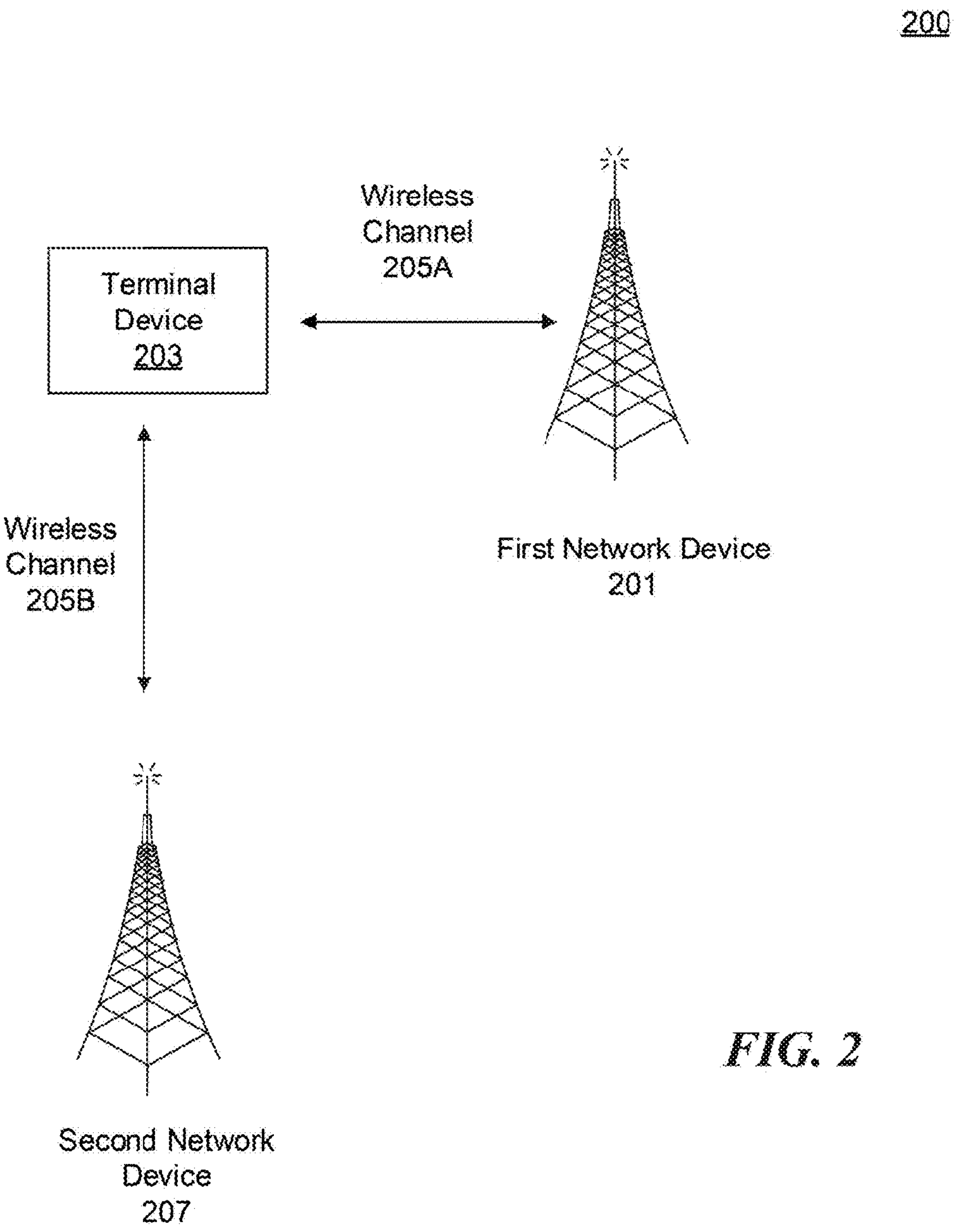
FIG. 2 is a schematic diagram of a wireless communication system in accordance with one or more implementations of the present disclosure.

FIG. 2 is a schematic diagram of a wireless communication system 200 in accordance with one or more implementations of the present disclosure. The wireless communication system 200 can implement the methods for enabling terminal devices to perform a PRACH transmission for non-serving cells discussed herein. As shown in FIG. 2, the wireless communications system 200 includes a first network device (or base station/cell) 201 and a second network device (or base station/cell) 207.

Examples of the first and second network devices 201 and 207 include a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP), etc. In some embodiments, the network devices 201 and 207 can include a relay station, an access point, an in-vehicle device, a wearable device, and the like. The first and second network devices 201 and 207 can include wireless connection devices for communication networks such as: a Global System for Mobile Communications (GSM) network, a Code Division Multiple Access (CDMA) network, a Wideband CDMA (WCDMA) network, an LTE network, a cloud radio access network (Cloud Radio Access Network, CRAN), an Institute of Electrical and Electronics Engineers (IEEE) 802.11-based network (e.g., a Wi-Fi network), an Internet of Things (IoT) network, a device-to-device (D2D) network, a next-generation network (e.g., a 5G network), a future evolved public land mobile network (Public Land Mobile Network, PLMN), or the like. A 5G system or network can be referred to as an NR system or network.

In FIG. 2, the wireless communications system 200 also includes a terminal device 203. The terminal device 203 can be an end-user device configured to facilitate wireless communication. The terminal device 203 can be configured to wirelessly connect to the first network device 201 (via, e.g., via a wireless channel 205A) according to one or more corresponding communication protocols/standards. In a "cell-switch" event, the terminal device 203 can be switched to wirelessly connect to the second network device 207 (via, e.g., via a wireless channel 205B). Before the "cell-switch" event, the first network device 201 can be noted as a "serving cell," and the second network device 207 can be noted as a "non-serving cell." After the "cell-switch" event, the second network device 207 becomes the "serving cell" and the first network device 201 becomes the "non-serving cell."

The terminal device 203 may be mobile or fixed. The terminal device 203 can be a user equipment (UE), an access terminal, a user unit, a user station, a mobile site, a mobile station, a remote station, a remote terminal, a mobile device, a user terminal, a terminal, a wireless communications device, a user agent, or a user apparatus. Examples of the terminal device 203 include a modem, a cellular phone, a smartphone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, an Internet-of-Things (IoT) device, a device used in a 5G network, a device used in a public land mobile network, or the like. For illustrative purposes, FIG. 2 illustrates only two network devices 201 and 207 and one terminal device 203 in the wireless communications system 200. However, in some instances, the wireless communications system 200 can include additional network device 201 and/or terminal device 203.

The first network device 201 (e.g., as a serving cell) can instruct the terminal device 203 to transmit PRACH information towards to the second network device 207 (e.g., as a non-serving cell). In some embodiments, the first network device 201 can provide a configuration of PRACH of one or more non-serving cells (including second network device 207) to the terminal device 203. The first network device 201 can send a first control signaling (e.g., an MAC CE, a DCI, etc.) to indicate the terminal device 203 to transmit PRACH information to the second network device 207. When receiving the first control signaling, the terminal device 203 is requested to transmit a PRACH preamble in a determined PRACH occasion towards to the second network device 207.

In some embodiments, the terminal device 203 can be indicated to a Random Access Channel (RACH) occasion for PRACH transmission based on one indicated SS/PBCH of the second network device 207. In some embodiments, the terminal device 203 can be requested to determine an uplink transmission configuration for transmitting the PRACH preamble based on the indicated SS/PBCH of the second network device 207. In some embodiments, the uplink transmission configuration can include a spatial transmit filter and/or an uplink transmit power.

When receiving the PRACH preamble from the terminal device 203, the first network device 201 determines a timing advance value for an uplink transmission towards the second network device 207. The first network device 201 can indicate the timing advance for the uplink transmission for the second network device 207 to the terminal device 203.

In some embodiments, the first network device 201 can use a "DCI format X" to trigger the terminal device 203 to transmit a PRACH preamble towards to a non-serving cell (e.g., the second network device 207). The "DCI format X" can include one or more of the following bit fields: (1) an indicator to indicate an identification (ID) of a cell; (2) an indicator of a SS/PBCH of a cell; (3) an indicator of a random access preamble index; and (4) indicator of a PRACH mask index.

In some embodiments, the "indicator to indicate an ID of a cell" can indicate a non-serving cell (e.g., the second network device 207) to which the terminal device 203 is indicated to transmit a PRACH preamble. The "indicator of a SS/PBCH of a cell" can indicate a SS/PBCH of a non-serving cell (e.g., the second network device 207). The terminal device 203 can be requested to use the indicated SS/PBCH to determine a RACH occasion for the PRACH transmission. In some embodiments, the "indicator of a random access preamble index" can indicate one PRACH preamble for the terminal device 203 to transmit. In some embodiments, the "indicator of a PRACH mask index" can be used to indicate a RACH occasion for the PRACH transmission.

In some embodiments, the first network device 201 can send one "DCI format 1_0" to trigger the terminal device 203 to transmit a PRACH transmission. In such embodiments, the "DCI format 1_0" can contain the following fields:

[i] Random Access Preamble index: in one example, it can be 6 bits. It can also indicate one RACH preamble index.

[ii] UL/SUL indicator: in one example, this field can be 1 bit. This field indicates which UL carrier in the network device to transmit the PRACH.

[iii] Indicator of physical cell ID (PCI): this field indicates which serving cell to transmit the PRACH.

[iv] SS/PBCH index: this field can be 6 bits. This field can indicate one SS/PBCH of the serving cell indicated by "indicator of physical cell ID" which can be used to determine the RACH occasion for the PRACH transmission.

[v] PRACH Mask index: this field can be 4 bits. This field can indicate the RACH occasion associated with the SS/PBCH indicated by "SS/PBCH index" for the PRACH transmission.

In some embodiments, the "DCI format 1_0" can contain the following fields:

[a] Random Access Preamble index: in one example it can be 6 bits. It can indicate one RACH preamble index.

[b] UL/SUL indicator: in one example, this field can be 1 bit. This field indicates which UL carrier in the cell to transmit the PRACH.

[c] SS/PBCH index: this field can indicate one SS/PBCH of the serving cell or a non-serving cell to be used to determine a RACH occasion for the PRACH transmission. For example, this field can be 8 bits and one of the first "N1" values of this field indicate one SS/PBCH of one cell and one of the next "N2" values of this field can indicate one SS/PBCH of another cell.

[d] PRACH Mask index": this field can be 4 bits. This field can indicate the RACH occasion associated with the SS/PBCH indicated by "SS/PBCH index" for the PRACH transmission.

In some embodiments, the bit fields of "DCI format 1_0" for triggering the PRACH transmission can vary depending on whether the terminal device 203 is configured with inter-cell PDCCH order PRACH transmission. For example, if the terminal device 203 is not configured with inter-cell PDCCH order PRACH transmission, the "DCI format 1_0" for triggering the PRACH transmission does not indicate an SS/PBCH of a non-serving cell. If the terminal device 203 is configured with inter-cell PDCCH order PRACH transmission, the "DCI format 1_0" for triggering the PRACH transmission can indicate an SS/PBCH of the serving cell or a non-serving cell.

In some embodiments, the "DCI format 1_0" used to trigger the PRACH transmission towards to a non-serving cell can be scrambled with a dedicated Radio Network Temporary Identity (RNTI). For example, if the Cyclic Redundancy Check (CRC) of the "DCI format 1_0" is scrambled by a first RNTI, then the "DCI format 1_0" triggers a PRACH transmission towards to a non-serving cell and the "DCI format 1_0" can indicate information of physical cell ID (e.g., showing which cell the triggered PRACH transmission is toward).

In some embodiments, the terminal device 203 can be provided with a timing advance value for a non-serving cell (e.g., the second network device 207). For example, the first network device 201 can provide a timing advance command for second network device 207 to the terminal device 203. When the terminal device 203 is switched to the second network device 207, the terminal device 203 can apply the provided timing advance command on the uplink transmission to the second network device 207.

In some embodiments, the first network device 201 can provide the timing advance command for the second network device 207 in a MAC CE message. In some embodiments, the first network device 201 can provide the timing advance for the second network device 207 in a response message to a PDCCH order PRACH transmission with a preamble sent to the second network device 207.

In some embodiments, in the MAC CE message, the first network device 201 can provide one or more of the following information elements: an indicator to indicate a physical cell ID, a TAG (timing advance group), a timing advance value, etc. In some embodiments, the timing advance value includes can be used by the terminal device 203 on its uplink transmission towards the cell identified by the field of "an indicator to indicate a physical cell ID" as discussed above.

In some embodiments, the first network device 201 can first send PDCCH information to trigger a PDCCH order PRACH transmission to a first cell (e.g., the second network device 207). After decoding the PDCCH information, the terminal device 203 initiates a PRACH transmission as requested by the first network device 201. The first network device 201 can then detect the PRACH transmission and calculate a timing advance value. After that, the first network device 201 can indicate the calculated timing advance value for the first cell to the terminal device 203, for example, through an MAC CE.

Figure 3:
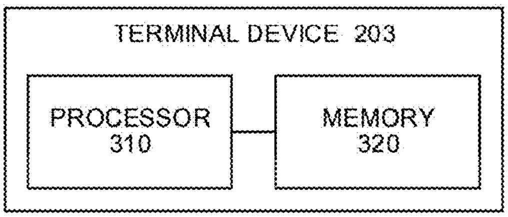
FIG. 3 is a schematic block diagram of a terminal device in accordance with one or more implementations of the present disclosure.

FIG. 3 is a schematic block diagram of a terminal device 203 (e.g., which can implement the methods discussed herein) in accordance with one or more implementations of the present disclosure. As shown, the terminal device 203 includes a processing unit 310 (e.g., a DSP, a CPU, a GPU, etc.) and a memory 320. The processing unit 310 can be configured to implement instructions that correspond to the methods discussed herein and/or other aspects of the implementations described above. It should be understood that the processor 310 in the implementations of this technology may be an integrated circuit chip and has a signal processing capability. During implementation, the steps in the foregoing method may be implemented by using an integrated logic circuit of hardware in the processor 310 or an instruction in the form of software. The processor 310 may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor 310 may be a microprocessor, or the processor 310 may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory 320, and the processor 310 reads information in the memory 320 and completes the steps in the foregoing methods in combination with the hardware thereof.

It may be understood that the memory 320 in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type. In some embodiments, the memory may be a non-transitory computer-readable storage medium that stores instructions capable of execution by a processor.

Figure 4:
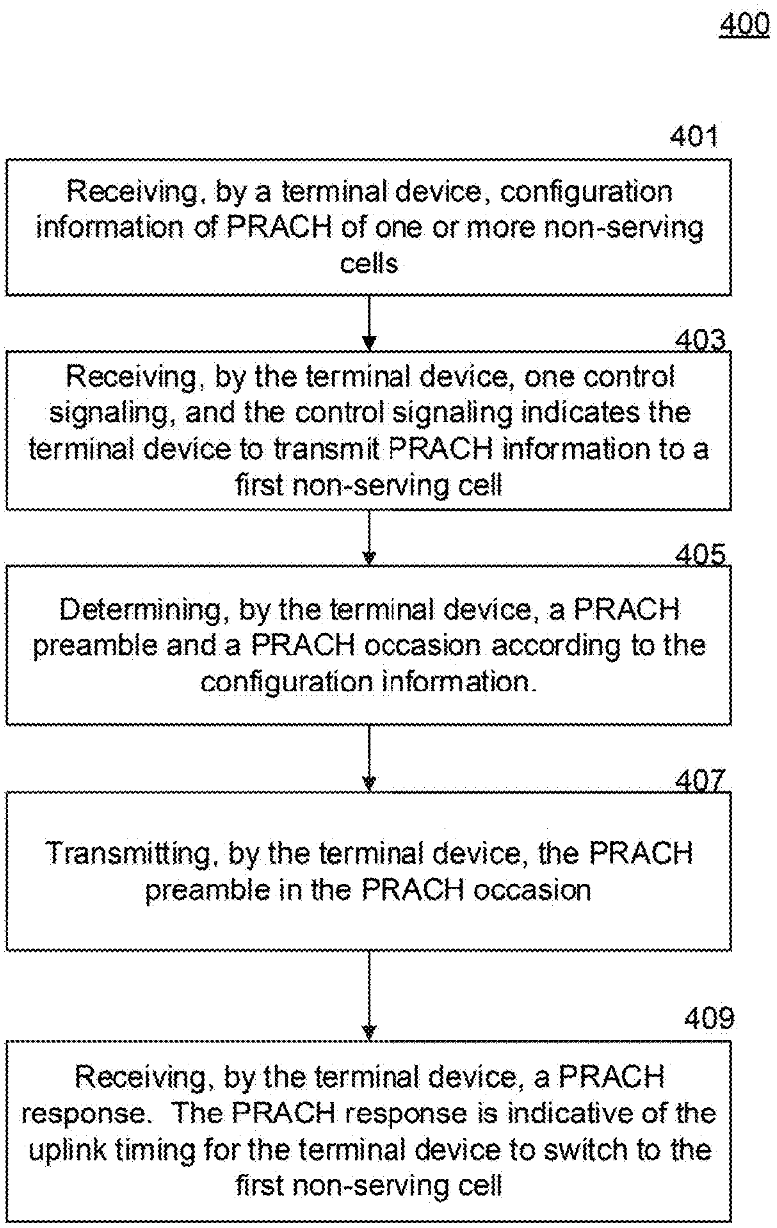
FIG. 4 is a flowchart of a method in accordance with one or more implementations of the present disclosure.

FIG. 4 is a flowchart of a method 400 in accordance with one or more implementations of the present disclosure. The method 400 is for enabling a terminal device to perform a PRACH transmission for non-serving cells. The method 400 can be implemented by a system (such as the wireless communications system 200). For example, the method 400 may also be implemented by the terminal device 203, the first network device 201, and/or the second network device 207.

The method 400 includes, at block 401, receiving, by a terminal device, configuration information of PRACH of one or more non-serving cells. At block 403, the method 400 continues by receiving, by the terminal device, one control signaling. The control signaling indicates the terminal device to transmit PRACH information to a first non-serving cell (e.g., the second network device 207).

At block 405, the method 400 continues by determining, by the terminal device, a PRACH preamble and a PRACH occasion according to the configuration information. At block 407, the method 400 continues by transmitting, by the terminal device (to the first network device 201), the PRACH preamble in the PRACH occasion. In some embodiments, the first network device 201 then detects the PRACH preamble and then an uplink timing of the terminal device 203 and the first non-serving cell can be determined.

At block 409, the method 400 continues by receiving, by the terminal device, a PRACH response. The PRACH response is indicative of the uplink timing for the terminal device to switch to the first non-serving cell.

Figure 5:
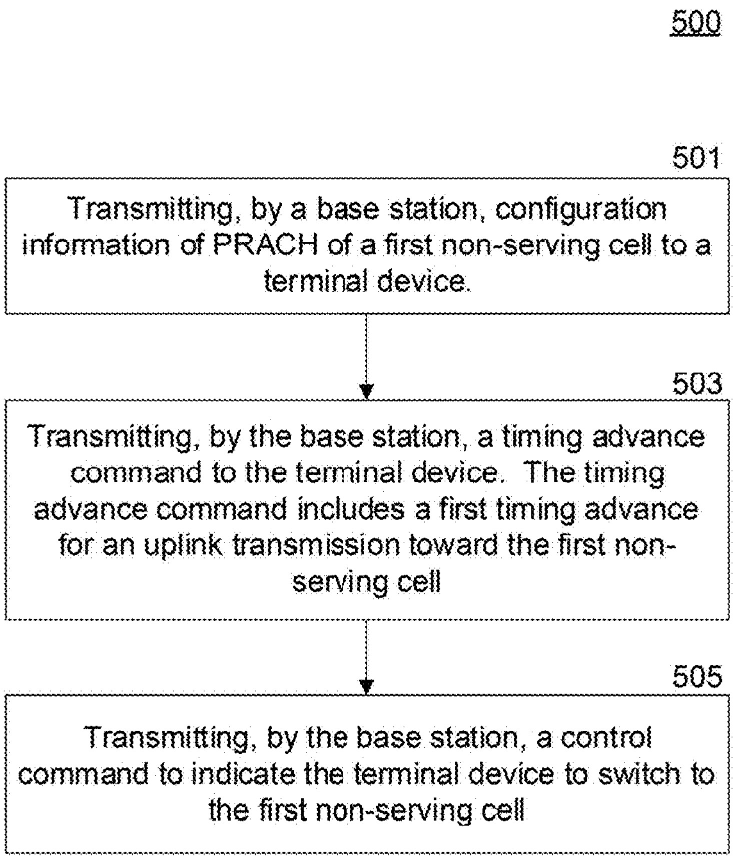
FIG. 5 is a flowchart of a method in accordance with one or more implementations of the present disclosure.

FIG. 5 is a flowchart of a method 500 in accordance with one or more implementations of the present disclosure. The method 500 enables a terminal device to perform a PRACH transmission for non-serving cells. The method 500 can be implemented by a system (such as the wireless communications system 200). For example, the method 500 may also be implemented by the terminal device 203, the first network device 201, and/or the second network device 207.

The method 500 includes, at block 501, transmitting, by a base station (e.g., the first network device 201), configuration information of PRACH of a first non-serving cell (e.g., the second network device 207) to a terminal device (e.g., the terminal device 203). At block 503, the method 500 continues by transmitting, by the base station, a timing advance command to the terminal device. The timing advance command includes a first timing advance for an uplink transmission toward the first non-serving cell.

At block 505, the method 500 continues by transmitting, by the base station, a control command to indicate the terminal device to switch to the first non-serving cell. In some embodiments, the control command can be a DCI. In some embodiments, the control command can be a MAC CE. The terminal device can then perform a cell-switch process (or an inter-cell mobile event) and switch to the first non-serving cell. The terminal device can start to perform the uplink transmission toward the first non-serving cell according to the first timing advance.

ADDITIONAL CONSIDERATIONS

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative implementations or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

In the Detailed Description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present disclosure. References in this description to "an implementation/embodiment," "one implementation/embodiment," or the like mean that a particular feature, structure, material, or characteristic being described is included in at least one implementation of the described technology. Thus, the appearances of such phrases in this specification do not necessarily all refer to the same implementation/embodiment. On the other hand, such references are not necessarily mutually exclusive either. Furthermore, the particular features, structures, materials, or characteristics can be combined in any suitable manner in one or more implementations/embodiments. It is to be understood that the various implementations shown in the figures are merely illustrative representations and are not necessarily drawn to scale.

Several details describing structures or processes that are well-known and often associated with communications systems and subsystems, but that can unnecessarily obscure some significant aspects of the disclosed techniques, are not set forth herein for purposes of clarity. Moreover, although the following disclosure sets forth several implementations of different aspects of the present disclosure, several other implementations can have different configurations or different components than those described in this section. Accordingly, the disclosed techniques can have other implementations with additional elements or without several of the elements described below.

Many implementations or aspects of the technology described herein can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium. Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The term "and/or" in this specification is only an association relationship for describing the associated objects, and indicates that three relationships may exist, for example, A and/or B may indicate the following three cases: A exists separately, both A and B exist, and B exists separately.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

The invention claimed is:

1. A method, comprising:

receiving, by a terminal device, configuration information of physical random access channel (PRACH) of one or more non-serving cells;

receiving, by the terminal device, a control signaling, wherein the control signaling indicates the terminal device to transmit PRACH information to a first non-serving cell of the one or more non-serving cells;

determining, by the terminal device, a PRACH preamble and a PRACH occasion according to the configuration information; and transmitting, by the terminal device, the PRACH preamble in the PRACH occasion;

wherein the PRACH preamble in the PRACH occasion is transmitted to a serving base station, and the PRACH preamble is used for the serving base station to determine an uplink timing of the terminal device toward the first non-serving cell.

2. The method of claim 1, wherein the terminal device receives the configuration information of PRACH of the one or more non-serving cells from the serving base station.

3. The method of claim 1, wherein the terminal device receives the control signaling from the serving base station.

4. The method of claim 1, wherein the method further comprises:

receiving, by the terminal device, the uplink timing from the serving base station.

5. The method of claim 1, wherein the PRACH preamble is used for the serving base station to determine the first non-serving cell.

6. The method of claim 1, wherein the control signaling includes a downlink control information (DCI).

7. The method of claim 6, wherein the DCI is in a DCI format containing one or more of the following bit fields:

an indicator to indicate an identification (ID) of the first non-serving cell;

an indicator of a synchronization signal/physical broadcast channel (SS/PBCH) of the first non-serving cell;

an indicator of a random access preamble index, indicating one PRACH preamble for the terminal device to transmit; or an indicator of a PRACH mask index, indicating a Random Access Channel (RACH) occasion for PRACH transmission.

8. The method of claim 7, further comprising:

determining, by the terminal device, the RACH occasion for the PRACH transmission based on the SS/PBCH of the first non-serving cell.

9. The method of claim 7, further comprising:

determining, by the terminal device, an uplink transmission configuration for transmitting the PRACH preamble based on the SS/PBCH of the first non-serving cell, wherein the uplink transmission configuration comprises a spatial transmit filter and/or an uplink transmit power.

10. The method of claim 1, wherein the control signaling includes a media access control (MAC) control element (CE) message.

11. A method, comprising:

transmitting, by a base station, configuration information of physical random access channel (PRACH) of one or more non-serving cells to a terminal device, wherein the base station is a serving base station of the terminal device;

transmitting, by the base station, a control signaling to the terminal device, wherein the control signaling indicates the terminal device to transmit PRACH information to a first non-serving cell of the one or more non-serving cells;

receiving, by the base station, a PRACH preamble in a PRACH occasion from the terminal device; and determining, by the base station based on the PRACH preamble, an uplink timing of the terminal device toward the first non-serving cell;

wherein the configuration information is used for the terminal device to determine a PRACH preamble and a PRACH occasion and to transmit the PRACH preamble in the PRACH occasion.

12. The method of claim 11, further comprising:

transmitting, by the base station, a timing advance command to the terminal device, wherein the timing advance command includes a first timing advance for an uplink transmission toward the first non-serving cell;

transmitting, by the base station, a control command to indicate the terminal device to switch to the first non-serving cell.

13. The method of claim 11, wherein the control signaling includes a media access control (MAC) control element (CE) message.

14. The method of claim 11, further comprising:

determining, by the base station, the first non-serving cell from two or more non-serving cells according to the PRACH preamble.

15. A terminal device, comprising:

a processor; and a memory storing instructions which, when executed by the processor, cause the terminal device to:

receive configuration information of physical random access channel (PRACH) of one or more non-serving cells;

receive a control signaling, wherein the control signaling indicates the terminal device to transmit PRACH information to a first non-serving cell of the one or more non-serving cells;

determine a PRACH preamble and a PRACH occasion according to the configuration information; and transmit the PRACH preamble in the PRACH occasion;

wherein the PRACH preamble in the PRACH occasion is transmitted to a serving base station, and the PRACH preamble is used for the serving base station to determine an uplink timing of the terminal device toward the first non-serving cell.

16. The terminal device of claim 15, wherein the terminal device receives the configuration information of PRACH of the one or more non-serving cells from the serving base station.

17. The terminal device of claim 15, wherein the PRACH preamble is used for the serving base station to determine the first non-serving cell.

18. The terminal device of claim 15, wherein the control signaling includes a media access control (MAC) control element (CE) message.

19. A base station, comprising:

a processor; and a memory storing instructions which, when executed by the processor, cause the base station to perform the method of claim 11.

* * * * *